United States Patent [19]

Uotila

[11] Patent Number: 4,993,667
[45] Date of Patent: Feb. 19, 1991

[54] METHOD FOR MAKING A PARACHUTE

[76] Inventor: Jarmo I. Uotila, Klaneettitie 12 F 71, SF-00420 Helsinki, Finland

[21] Appl. No.: 831,010

[22] Filed: Feb. 19, 1986

[30] Foreign Application Priority Data

Feb. 20, 1985 [FI] Finland ............................. 850686

[51] Int. Cl.⁵ ............................................. B64D 17/02
[52] U.S. Cl. ................................. 244/142; 244/145
[58] Field of Search ............................ 244/142, 145

[56] References Cited

U.S. PATENT DOCUMENTS

| 2,048,159 | 7/1936 | Hoffman | 244/142 |
| 2,851,389 | 9/1958 | Lappala | 244/142 |
| 3,331,573 | 7/1967 | Winka et al. | 244/145 |
| 3,780,970 | 12/1973 | Pinnell | 244/142 |
| 3,848,834 | 11/1974 | Phillips, Jr. | 244/145 |
| 4,326,683 | 4/1982 | Uotila | 244/145 |

FOREIGN PATENT DOCUMENTS

| 901137 | 1/1954 | Fed. Rep. of Germany | |
| 1181067 | 11/1964 | Fed. Rep. of Germany | 244/145 |
| 492140 | 9/1930 | United Kingdom | 244/145 |
| 518997 | 3/1940 | United Kingdom | 244/145 |
| 849555 | 9/1960 | United Kingdom | 244/145 |

Primary Examiner—Galen Barefoot
Attorney, Agent, or Firm—McGlew & Tuttle

[57] ABSTRACT

A method of manufacturing a parachute having a canopy with an outer peripheral skirt and a plurality of spaced apart attachment points comprises selecting one of the attachment points as a starting point and winding a continuous fiber from the starting point to other attachment points until a net of reinforcement fiber is formed among the attachment points. A canopy is then attached to the resulting reinforcement net. Nonporous material can be used for the canopy because of the strong reinforcement achieved.

20 Claims, 5 Drawing Sheets

METHOD FOR MAKING A PARACHUTE

FIELD AND BACKGROUND OF THE INVENTION

The present invention relates in general to parachute design and manufacture, and in particular to a new and useful method of making a parachute which utilizes a particular configuration of reinforcement lines and wherein even nonporous material can be used for the parachute canopy.

Conventional round textile parachutes are usually made in the following manner: First, gores each having the form of a circle segment, are made either by direct cutting out of cloth or sewing from smaller pieces. From these gores the canopy is sewn together either to form a flat circle or a shallow cone, depending on the number of gores and the segment angle of each gore. The possible reinforcements are added at this time into the canopy and some more reinforcements are added when the suspension lines are sewn into the canopy. The suspension lines either can continue from the skirt over the canopy vent back to the opposing skirt or they are attached only to the skirt. In the latter case the gore seam can be reinforced some more. The reinforcements are naturally put on such places, where the strength of the original structure is insufficient compared to the stresses which will be placed on the parachute in use.

The manufacturing technique need is also dictated by the width and price of the cloth used. The canopy must be put together from smaller parts and with little leftover. From this point of view for example plastic film would be a more suitable material. It is available in larger widths (several yards) and for a fraction of the cost of textile cloth. However, plastic films have properties, which make it useless as parachute material. It is fully nonporous, wherefrom follows an increased opening shock and the already low strength of the film cannot stand the increased stresses. A nonporous canopy is also unstable, which makes it unsuitable for some purposes. Plastic film cannot be sewn, but one must use manufacturing techniques suitable for the material, like heat seaming or glueing.

U.S. Pat. No. 4,326,683 to the present inventor, as well as U.K. patent 1,587,309 and Finnish patent 54,893, disclose an invention where a canopy of nonporous material can be changed with addition of a particular porosity, into a stable parachute with so smooth an opening, that plastic film can be used as the parachute material in some cases. The problems in manufacturing, like reinforcing the canopy, however, are not solved by this invention.

The stresses in the canopy follow from aerodynamic pressure loading, which is the pressure differential from the inside to the outside of the opening canopy. The first structural element taking this loading is the canopy material, which stresses both in the direction of the suspension lines (radially) and perpendicular to them (tangentially). The radial stresses are transferred into the suspension lines and the tangential stresses open up the canopy and load mainly the canopy material. The suspension lines transfer the loading to the suspended load in the confluence point. The distribution of the pressure loading in the canopy area is a very complicated phenomenon, which is theoretically not well known. During the opening phase, when the loading is highest, the air flow is dynamic in the surrounding and through an elastic and porous body, which flow is partly laminar and mainly turbulent and separated from the body.

SUMMARY OF THE INVENTION

The present invention provides a manufacturing method wherein a simple structure combined with sufficient strength, makes it possible to use plastic film as canopy material. A simple structure is preferred, because of its suitability for automation.

The purpose of the invention is reached by taking a continuous line or fiber (yarn), bringing it by the attachment points of the suspension lines and joining this fiber to the canopy material. By bringing the fiber with different modulus (every second, third, fourth, etc.) between attachment points the reinforcing effect is different over the canopy. This makes it possible to control the reinforcement both in location and direction.

For example, by bringing the reinforcing fiber directly over the canopy to the opposing attachment point the reinforcement effect is only radial in the surrounding material of the fiber. But by shifting the direction from the opposite (for example by one attachment point) the center portion of the canopy is reinforced tangentially while the skirt portion is radially reinforced, directed towards the suspension line attachment points, as is theoretically orthodox. As an extreme, the fiber can be brought through every second attachment point, which reinforces only the skirt portion of the canopy and mainly tangentially.

This reinforcing net can be easily built on the edges of a circular plate, through poles which are located at the suspension line attachment points. In this case the joining of the reinforcing net into the canopy material takes place at best after the fiber is wound. The canopy must be slightly smaller, so that the poles remain outside the canopy. Now, after joining, the ready canopy can be lifted out from the poles and the suspension lines can be attached into the loops, which are formed on the poles.

An even more economical variation is to bring the fiber to the edges of the above mentioned plate, and instead of circling from one pole to another, to a hook below the plate and then back to the edge, wherefrom the fiber is brought as usual to the next "attachment point" on the edge of the plate. This provides, with the same fiber, both the canopy reinforcement and the suspension lines. The disadvantage with this variation is, that only "deep" angles, direct over the canopy are possible. With "shallow" angles reinforcing the skirt, the fiber has a tendency to drop out from the edge, resulting from stressing the fiber-to-canopy material joint somewhat "sideways".

The above mentioned manufacturing method and its variation are easily applied for automatic manufacturing. For example, the canopy material can be two plastic films, which are heat sealed together, below and on top of the reinforcing net. The reinforcing net can be built by winding around the mentioned poles with a robot arm for example.

By choosing the strength of the fiber, the winding moduli and their individual winding multitudes one can get a proper total strength distribution (radial/tangential direction, location in the canopy). The strength should of course be distributed in the same way as the stresses. The canopy material strength requirement is not high, because it can be reinforced with a dense net. The function of the canopy material is in this case mainly to forward the aerodynamic pressure loading to the reinforcing net. The canopy material strength requirement can also be controlled with the choice of different moduli of elasticity of the reinforcing net and the canopy material.

The manufacturing method is also not restricted to only circular canopies, but it can also be applied to different forms of canopies, for example to cross type parachutes. Also the reinforcing net can be built over a shallow cone and, by joining the conical canopy material, it becomes a conical canopy.

With larger canopies it is sometimes found economical to manufacture first some portions of the canopy (with circular canopy say for example a segment of ⅛ of the total canopy) and to attach these together to form the canopy. This can be achieved by additional (in addition to the suspension line attachment points) "gore attachment" points to proper places and then later joining the gores from the attachment points. This saves quite a lot of manufacturing space.

Accordingly an object of the present invention is to provide a method of manufacturing a parachute or part thereof which has a canopy with an outer peripheral skirt and a plurality of spaced apart attachment points on the skirt, comprising selecting one of the attachment points as a starting point, winding a continuous fiber from the starting point to another attachment point to form a first reinforcing strand, winding the continuous fiber from the other attachment point to a still further attachment point to form a second reinforcing strand, continuing the winding of the continuous fiber from attachment point to attachment point until all attachment points have at least one strand extending therefrom to form a reinforcement net between the attachment points, and connecting a canopy to the reinforcement net.

A further object of the invention is to provide a parachute with a reinforced canopy made in accordance with the method of the invention.

A still further object of the invention is to provide a canopy which can be made of nonporous material, such as plastic film.

Another object of the invention is to provide a canopy made of nonporous material which also follows the principles laid down in U.S. Pat. No. 4,326,683, which is incorporated here by reference.

Another object of the present invention is to provide a parachute which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2b is a enlarged section of the embodiment of FIG. 2a;

FIG. 2c is a side elevational view of the embodiment of FIG. 2a;

FIG. 3b is an enlarged section of the embodiment of FIG. 3a;

FIG. 3c is a side elevational view of the embodiment of FIG. 3a;

DESCRIPTION OF THE PREFERRED EMBODIMENTS

Figure 1A:
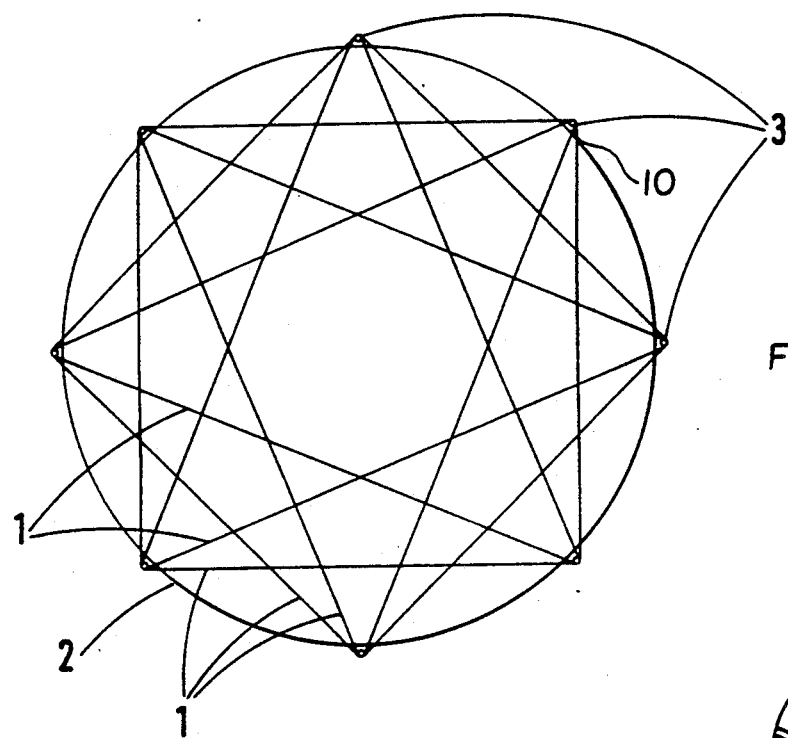
FIG. 1a is a top plan view of a reinforced canopy for making a parachute in accordance with the present invention.

Referring to the drawings in particular, the invention embodied therein comprises a method of making part or all of the parachute having a unique arrangement of reinforcing line or fiber.

Figure 1B:
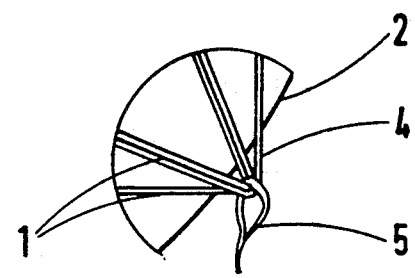
FIG. 1b is an enlarged portion of FIG. 1a showing an attachment point.
Figure 1C:
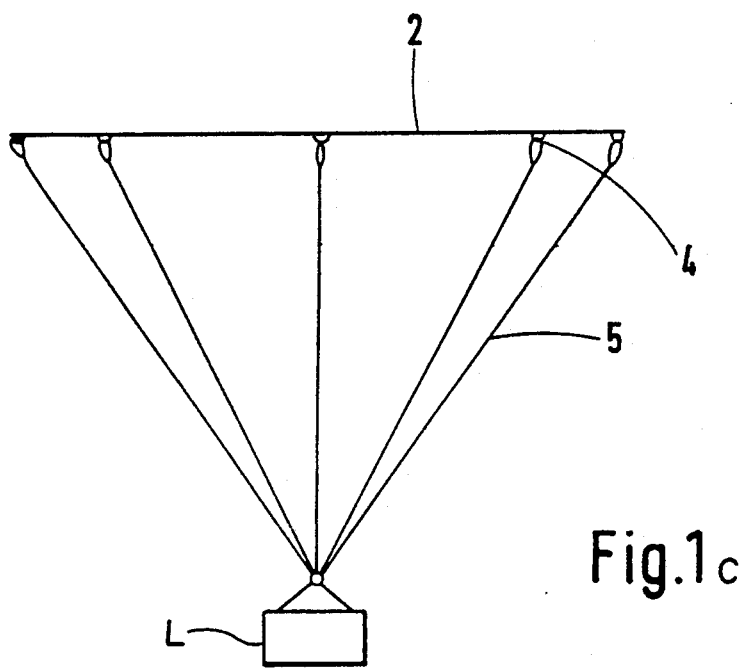
FIG. 1c is a side elevational view of a parachute made in accordance with the invention and carrying a load.

FIG. 1a shows a flat circular canopy, where a continuous fiber 1 is brought through eight suspension line attachment points 3, in such a manner that to each point there has formed a loop 4 as shown in FIG. 1b, for attaching the suspension lines 5. The reinforcing fiber is brought around the same points several times and the same winding modulus (every second, every third) is used for several times, too. The reinforcing net is joined to the circular canopy material 2. FIG. 1c shows the canopy with suspension lines and a load L.

To aid in the formation of loops 4, a pole 10 is provided at each attachment point 3, each pole being just outside the outer peripheral skirt of the canopy 2. The continuous fiber 1 can then easily be wound from one of the attachment points which is selected as a starting point, to and around the poles at the other attachment points in any desired sequence. A reinforcing strand of continuous fiber is then formed between attachment points and between poles until all attachment points have at least one reinforcing strand extending therefrom. As shown in FIG. 1a, four reinforcing strands extend from each attachment point and form the reinforcement net to which the canopy 2 is connected. If the canopy is made of nonporous heat sealable plastic, the canopy can merely be heat sealed or otherwise attached, for example by glueing or other appropriate means, to the reinforcement net.

Other embodiments of the invention which will be described hereinunder, utilize two sheets of canopy material one above and one below the reinforcement net, the two sheets being heat sealed or otherwise connected together with their reinforcement net therebetween.

In the additional Figures, the same reference numerals are utilized to designate the same or similar parts.

It is also noted that the canopy 2, where made of nonporous material, can follow the principles of the inventor's U.S. Pat. No. 4,326,683 which is incorporated here by reference.

Figure 2A:
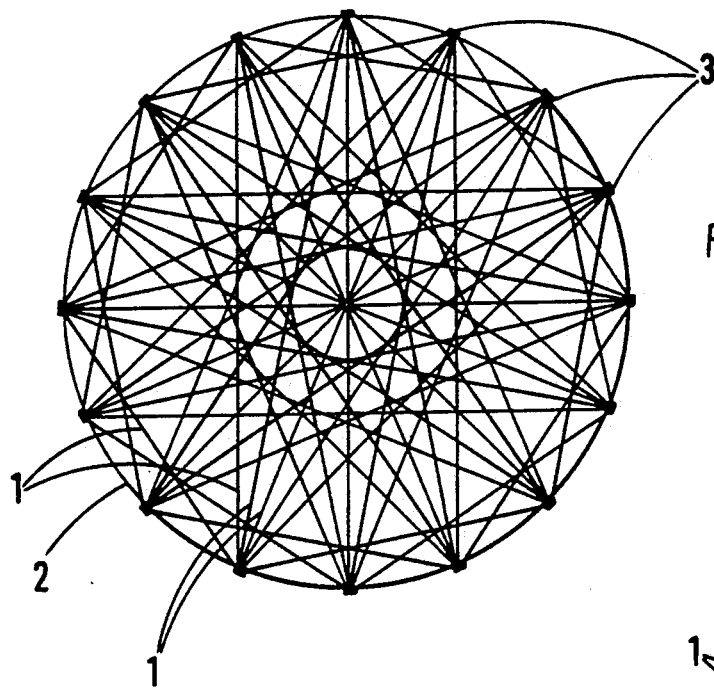
FIG. 2a is a view similar to FIG. 1a of another embodiment of the invention.
Figure 2B:
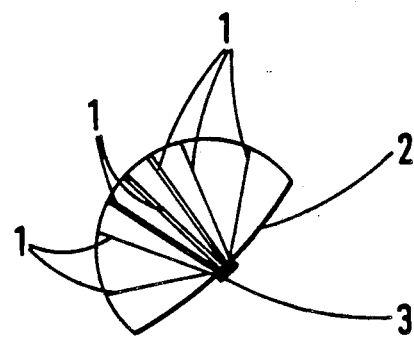
Figure 2C:
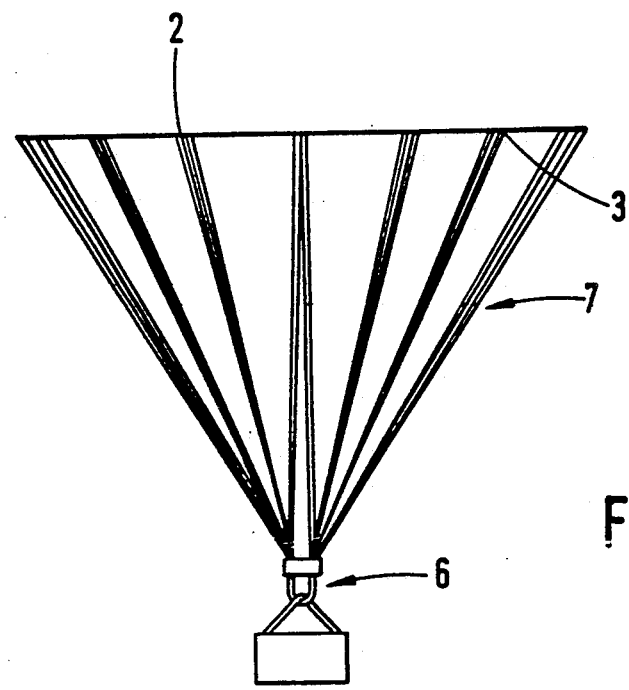

In FIGS. 2a, 2b and 2c, there is also shown a manufacturing method according to the invention, where the continuous fiber 1 is brought in the canopy area between the suspension line attachment points 3. Outside the canopy area the fiber is brought from one attachment point 3 to the confluence point 6 and back again to the same or a different one of the attachment points 3. The attachment points 3 are located on the edges of the canopy material 2 and the fiber is not wound several times with the same modulus.

Figure 3A:
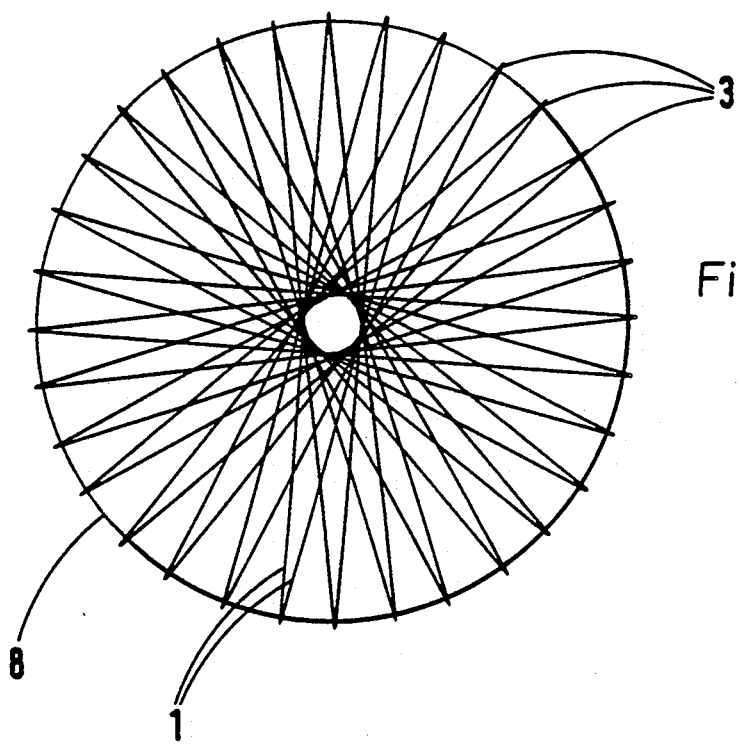
FIG. 3a is a view similar to FIG. 1a of a still further embodiment of the invention.
Figure 3B:
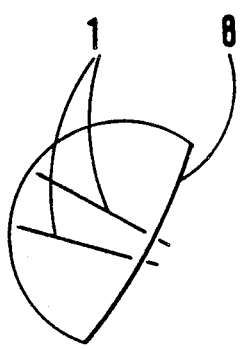
Figure 3C:
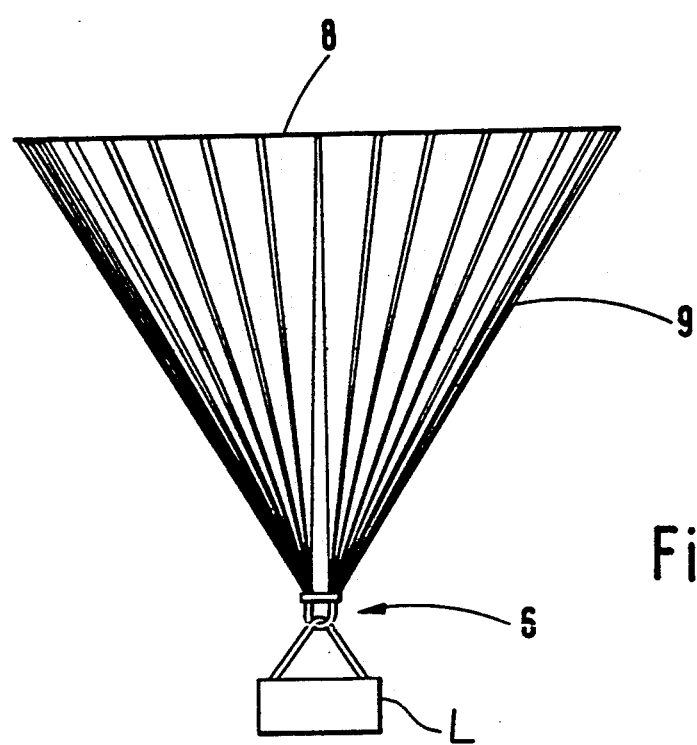

FIGS. 3a, 3b and 3c, present a simple manufacturing method, where the reinforcing fiber 1 is brought around an attachment point 3 only once (back and forth), but where there are many attachment points. The reinforcing fibers are brought almost directly over the canopy, which gives practically only radial reinforcement. The canopy material is two round plastic films 8 which are joined together with the fibers in the canopy area, one film being below and the other above the fibers. Outside the canopy area the fibers go to the confluence point 6, thereby forming numerous suspension lines 9.

Figure 4:
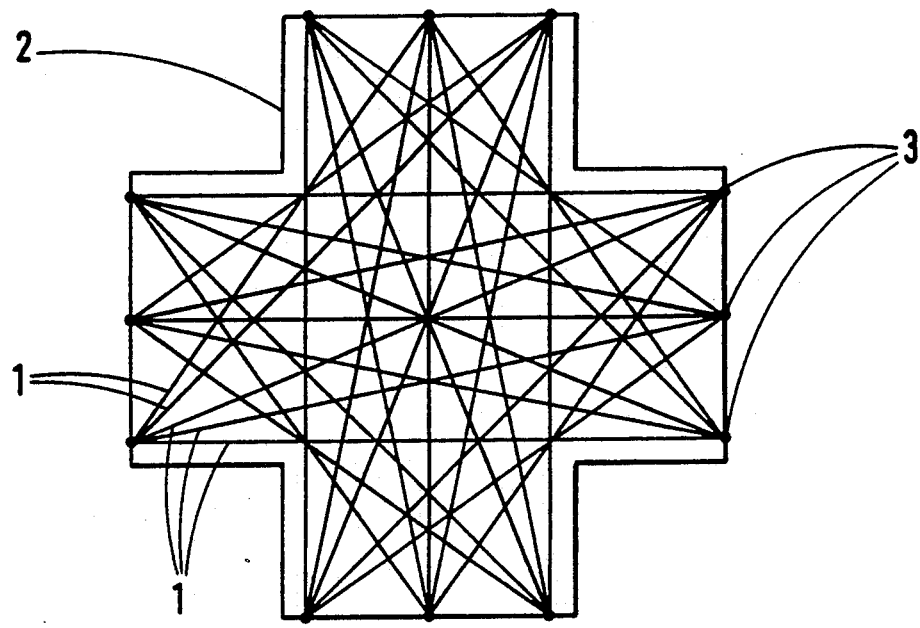
FIG. 4 is a top plan view of a still further embodiment of the invention.

FIG. 4 shows a case, where the canopy material 2 is cut in the form of a cross and where the suspension line attachment points 3 are located at the outermost side of the cross arms. Between the attachment points the continuous fiber 1 is wound.

Figure 5:
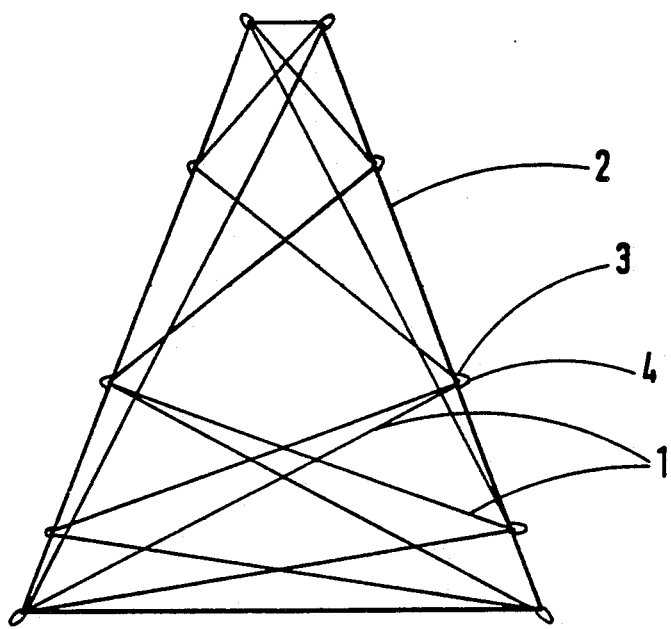
FIG. 5 is a top plan view of a single gore which can be manufactured in accordance with the invention and which can be connected to other similar gores to form a parachute.

FIG. 5 shows a case, where a part of the canopy is made according to the presented method. The part is a segment of a circle and the final form of the canopy would be circular flat or conical.

Additional variations are for example, the winding can be done with two or more fibers at the same time, each fiber even having their own winding orders, some would form also the suspension lines and some maybe just reinforce the canopy without any suspension lines attached to the loops (only for fictitious suspension lines).

It is also recognized, that this manufacturing method does not hinder applying the principles of the mentioned U.S. Pat. No. 4,326,683 with regard to porosity because the reinforcing fibers are so thin, that they do not hinder the air flow in the large holes according to the mentioned U.S. patent. The reinforcing fibers just continue through the holes.

This invention has been applied in practice and it has been found to operate well in tests. For example, by using two plastic film sheets as canopy material and spun plastic fibers as reinforcing fiber, one has made parachutes, which have survived at speeds of about 1000 km/h. The diameter of these parachutes has been over one meter. A textile parachute of comparative strength would have been impossible to pack into the same volume.

Figure 6:
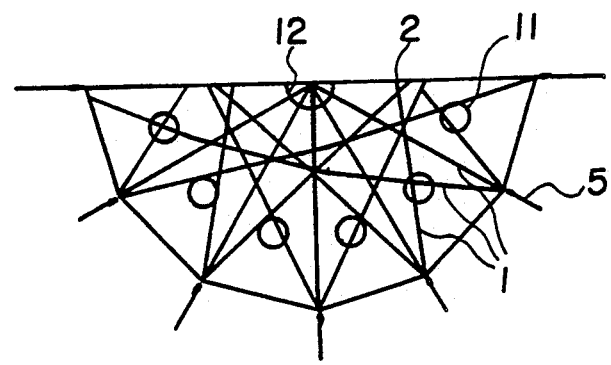
FIG. 6 is a partial top plan view showing another embodiment of the invention which utilizes a nonporous canopy material with openings therein.
Figure 7:
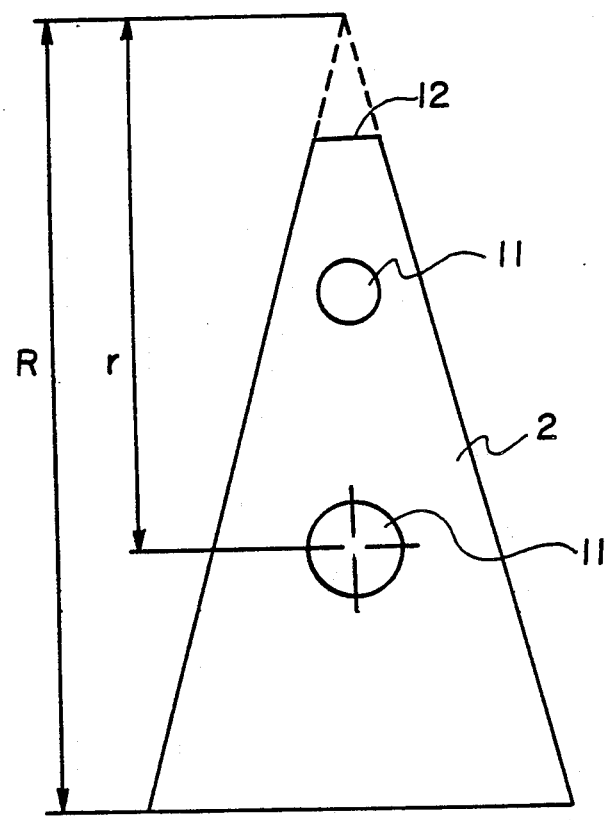
FIG. 7 is a top plan view of canopy material which can be used to make one gore of the embodiment of FIG. 6.

FIGS. 6 and 7 show an embodiment of the invention which utilizes the reinforcement net of the invention which also follows the principles of the inventor's patent U.S. Pat. No. 4,326,683.

As shown in FIG. 7, each gore of canopy 2 is substantially triangular and defines a central vent opening 12 which is shown in FIG. 6. The canopy includes a plurality of circumferentially spaced holes 11 each positioned at a selected radial distance from the vent opening 12. The plurality of holes are all disposed in a zone of the canopy which is confined between 40 and 80% of the radial distance r from the center of the vent opening to the skirt, R, the total area of the holes 11 being from 10 to 25% of the total area of the canopy 2. The canopy, half of which is shown in FIG. 6, comprises a plurality of circumferentially disposed substantially triangular gores as shown in FIG. 7, connected to each other at seams extending radially from the vent opening 12 to the skirt. Each of the gores has a width in the vent opening 12 which is substantially larger than $D_v \sin(180°/N)$ where $D_v$ is the diameter of the vent opening 12 and N is the number of gores comprising the canopy 2, each seam between adjacent gores being substantially a straight line.

As shown in FIG. 7 the holes are disposed between seams that connect the gores together. The canopy may be made of plastic film material, plastic film which has a reinforcement fiber attached to it, or nonporous textile cloth.

While specific embodiments of the invention have been shown and described in detail to illustrate the application of the principles of the invention, it will be understood that the invention may be embodied otherwise without departing from such principles.

What is claimed is:

1. A method of manufacturing at least part of a parachute having a canopy with an outer peripheral skirt and a plurality of spaced apart attachment points on the skirt, comprising selecting one of the attachment points as a starting point, winding a single continuous fiber from the starting point to another attachment point to form a first reinforcing strand of fiber, winding the continuous fiber from said other attachment point to a further attachment point to form a second reinforcement strand of fiber, continuing the winding of the continuous fiber from attachment point to attachment point until all attachment points have at least one strand of fiber extending therefrom so as to form a reinforcement net between the attachment points, and connecting a canopy to the reinforcement net.

2. A method according to claim 1, wherein the canopy is made only of nonporous plastic film.

3. A method according to claim 2, wherein the continuous fiber is brought outside the peripheral skirt of the canopy and at least some of the attachment points to form a loop of fiber.

4. A method according to claim 3, including attaching suspension lines to each loop of fiber.

5. A method according to claim 3, including forming a plurality of reinforced canopies and connecting loops of adjacent canopies together to form a parachute.

6. A method according to claim 2, including extending the continuous fiber beyond the peripheral skirt of the canopy at at least some attachment points to form suspension lines.

7. A method according to claim 2, wherein the canopy is made of a first plastic film on one side of the reinforcement net and a second plastic film on an opposite side of the reinforcement net attached to the first plastic film.

8. A method according to claim 1, wherein said canopy is made of material that is nonporous said canopy having a substantially centrally located vent opening, said canopy including a plurality of circumferentially spaced holes each positioned at a selected radial distance from said vent opening, said plurality of holes all disposed in a zone of said canopy which is confined between 40 and 80% of the radial distance from the center of said vent opening to said skirt, the total area of said holes being from 10 to 25% of the total area of said canopy, said canopy comprising a plurality of circumferentially disposed substantially triangular gores connected to each other at seams extending radially from said vent opening which is substantially larger than $D_v \sin(180°/N)$, where $D_v$ is the diameter of said vent opening and N is the number of gores comprising said canopy, each seam between adjacent gores being substantially a straight line.

9. A method according to claim 8, wherein said holes in said confined zone are disposed between said seams and in said gores whereby said holes do not reach or weaken said seams.

10. A method according to claim 8, wherein the canopy is made of a plastic film.

11. A method according to claim 10, wherein the plastic film includes a fabric reinforcement.

12. A method according to claim 9, wherein said triangular gores are each made of plastic film with the plastic film gores being heat-sealed to each other along said seams.

13. A method according to claim 8, wherein said canopy is made of nonporous textile cloth.

14. A parachute comprising a canopy having an outer peripheral skirt and a plurality of spaced apart attachment points on said skirt, a single continuous fiber wound from one attachment point which is selected as a starting point, to another attachment point to form a first reinforcing strand, the continuous fiber extending from the other attachment point to a still further attachment point to form a second reinforcing strand and further to all attachment points so that each attachment point has at least one strand extending therefrom forming a reinforcement net between said attachment points, said canopy being connected to said reinforcement net.

15. A parachute according to claim 14, including a loop of continuous fiber at each attachment point and a suspension line connected to each loop.

16. A parachute according to claim 14, wherein said canopy is made of nonporous material.

17. A parachute according to claim 14, wherein each attachment point has at least two strands extending therefrom each extending to a different attachment point.

18. A parachute according to claim 17, wherein said canopy is made of plastic film.

19. A parachute according to claim 18, wherein said plastic film has a plurality of holes therein to produce a selected porosity.

20. A parachute according to claim 19, wherein at least some strands of said reinforcement net extend across said holes.

* * * * *